United States Patent

Brinton, Jr.

[11] Patent Number: 5,679,421
[45] Date of Patent: Oct. 21, 1997

[54] BIODEGRADABLE BAGS AND PROCESSES FOR MAKING SUCH BIODEGRADABLE BAGS

[76] Inventor: William F. Brinton, Jr., Old Rome Rd., Rte. 2, Box 1850, Mt. Vernon, Me. 04352

[21] Appl. No.: 549,933

[22] Filed: Oct. 30, 1995

[51] Int. Cl.[6] .............. B32B 29/00; B65D 65/46
[52] U.S. Cl. .............. 428/34.3; 428/35.2; 428/481; 428/532; 428/913; 383/1
[58] Field of Search .............. 383/1; 428/35.2, 428/35.4, 35.7, 36.6, 36.7, 532, 533, 537.5, 511, 518, 34.2, 34.3, 481, 913, 480, 483, 514

[56] References Cited

U.S. PATENT DOCUMENTS

| | | | |
|---|---|---|---|
| 3,762,454 | 10/1973 | Wilkins, Jr. | 383/1 |
| 5,108,807 | 4/1992 | Tucker | 383/1 |
| 5,111,933 | 5/1992 | Di Biasi et al. | 383/1 |
| 5,178,469 | 1/1993 | Collinson | 383/1 |
| 5,190,533 | 3/1993 | Blackburn | 428/913 |
| 5,213,858 | 5/1993 | Tanner et al. | 428/34.2 |
| 5,434,004 | 7/1995 | Ajioka et al. | 428/537.5 |
| 5,487,947 | 1/1996 | Kakashita et al. | 428/36.6 |
| 5,492,410 | 2/1996 | Cocozza | 383/1 |

*Primary Examiner*—Rena Dye
*Attorney, Agent, or Firm*—Frederick R. Cantor, Esq.

[57] ABSTRACT

Biodegradable bags can be formed out of two-ply sheet materials that include an outer ply of kraft paper and an inner ply of biodegradable thermoplastic material. The two-ply sheets are formed and connected together with the use of biodegradable adhesives that do not constitute barriers to biodegradation of the bag material in a composting environment. The sheets are preferably laminated and joined together, using heat-sealing procedures. Preferred biodegradable materials are polyvinyl alcohol, hydroxyethylcellulose polymer, polyethylene glycol polymer, polycaprolactone, polylactic acid, hydroxybutyrate polymer, hydroxyvalerate polymer, and a copolymer of hydroxybutyrate and hydroxyvalerate.

4 Claims, 1 Drawing Sheet

BIODEGRADABLE BAGS AND PROCESSES FOR MAKING SUCH BIODEGRADABLE BAGS

BACKGROUND OF THE PRESENT INVENTION

1. Field of the Invention

This invention relates to biodegradable bag materials, and to a process for making a biodegradable bag, i.e., a bag that will break down into inert fragments within a few weeks time after placement in a composting environment, or other earth environment having microbial activity.

2. Prior Developments

U.S. Pat. No. 5,178,469, issued to Jonathan Collinson on Jan. 12, 1993, describes a biodegradable bag of two ply construction, comprising an inner layer of cellulose laminated onto an outer paper layer. The inner cellulose layer gives the bag resistance to penetration of the wall by liquids that might be associated with garbage, grass clippings and similar materials. The bag can be used to contain various semi-dry materials that would destroy ordinary paper bags.

SUMMARY OF THE PRESENT INVENTION

The present invention is concerned with a bag construction that is functionally similar to the bag disclosed in U.S. Pat. No. 5,178,469, but which uses different biodegradable materials for the bag inner layer. In preferred practice of the present invention, the inner ply of the two ply bag wall is formed of a biodegradable thermoplastic material selected from the group consisting of hydroxybutyrate-hydroxyvalerate copolymer, lactic acid polymer, polycaprolactone, and polyvinyl alcohol. These thermoplastic materials, in film form, are highly resistant to passage of liquid there though, while at the same time being essentially completely biodegradable when subjected to microbial activity over a reasonable period of time, e.g., a few weeks in a Composting environment, etc.

The above-referenced thermoplastic materials can be advantageously laminated to kraft paper to form a two ply bag material, using heat as the laminating instrumentality. The use of heat as the laminating force is beneficial.

In some forms of the invention, the biodegradable film materials are laminated to the paper sheet with a starch adhesive interlayer. The starch is water-soluble and therefore not a barrier to biodegradation in the composting environment.

The present invention is concerned with a process for forming a biodegradable bag, wherein heat is used to laminate a thermoplastic biodegradable material to a kraft paper strip, in order to form a two-ply bag wall material having biodegradable characteristics. An interlayer of starch, or other biodegradable, adhesive, can be provided between the paper and biodegradable plastic to promote adhesion between the plastic and the paper. As a further feature of the present invention, heat can also be used to join selected areas of the two-ply sheet material into a useful bag construction. The final bag structure uniquely contains no additions that might interfere with biological fragmentation of the bag materials in a composting environment.

In summary, and in accordance with the above discussion, the foregoing objectives are achieved in the following embodiments.

1. A multi-ply laminate bag material comprising a paper layer and a layer of a biodegradable polymer resin bonded to said paper layer with biodegradable adhesives that will not retard biological fragmentation of the bag material in a composting environment; and said resin being formed of an organic material containing only oxygen, hydrogen and carbon, and wherein the organic monomer contains the hydroxyl radical.

2. The bag material, as described paragraph 1, wherein said resin is selected from the group consisting of polyvinyl alcohol, hydroxyethylcellulose, polyethylene glycol, polycaprolactone, polylactic acid, hydroxybutyrate, hydroxyvalerate, and hydroxybutyrate-hydroxyvalerate copolymer.

3. The bag material, as described in paragraph 1, wherein the paper layer is bonded to the polymer resin solely by a fused resin surface directly adhered to the paper.

4. The bag material, as described in paragraph 1, and further comprising an interlayer of starch between the paper and the resin.

5. A process for forming a biodegradable bag, comprising:
   a) laminating a thermoplastic biodegradable film onto a strip of kraft paper to form a two ply strip;
   b) bringing a pair of two ply strips formed in step a together, so that the biodegradable films of said two ply strips are in facial contact;
   c) heat sealing selected face areas of the facially-engaged strips together; and
   d) cutting the heat-sealed strips at selected points to form individual bags.

6. The process, as described in paragraph 5, wherein said biodegradable film is formed from a material selected from the group consisting of hydroxybutyrate, hydroxyvalerate, hydroxybutyrate-hydroxyvalerate copolymer, polylactic acid polymer, polycaprolactone, polyvinyl alcohol, polyethylene glycol, and hydroxyethylcellulose.

7. The process, as described in paragraph 5, wherein the heat sealing step c is carried out so that the heat is directed through the kraft paper into the biodegradable film.

BRIEF DESCRIPTION OF THE DRAWINGS OF THE PRESENT INVENTION

DESCRIPTION OF THE PREFERRED EMBODIMENTS OF THE PRESENT INVENTION

Figure 1:
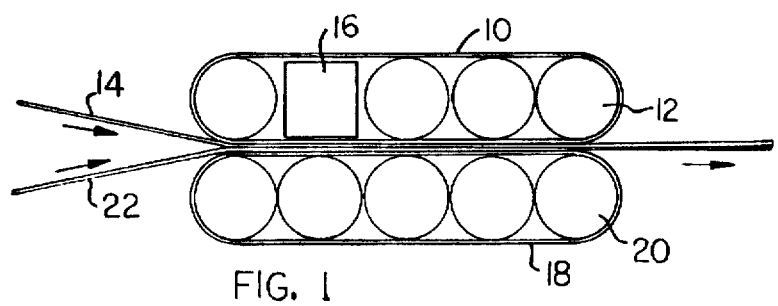
FIG. 1 is a schematic representation, showing a side elevational view, of an apparatus that can be used to laminate a biodegradable thermoplastic strip onto a strip of kraft paper, using heat as the laminating force.

The present invention comprises a bag formed of an outer paper layer and an inner layer of biodegradable thermoplastic material. The thermoplastic material is preferably a water soluble resin containing the hydroxyl radical in the repeating monomer.

The paper can be adhered to the water-soluble resin by the use of heat at a level sufficient to fuse the surface of the resin film in contact with the paper. The use of heat can be augmented by spraying a thin film of starch, or other suitable biodegradable adhesive, on the surface of the paper or the water-soluble resin. The starch, or other suitable biodegradable adhesive, serves as a water-soluble adhesive for laminating the resin to the paper.

Organic polymeric resins comprised solely of carbon, hydrogen and oxygen, and containing the hydroyl ion or radical, are quite often slowly soluble in water. These resins are also thermoplastic in nature, so as to be susceptible of being laminated to paper by the application of heat. The present invention contemplates the combination of such thermoplastic resins and paper to form a multi-ply laminate usable in the formation of bags designed to contain wet or moist materials, or to contain materials that it is desired to shield from ambient moisture.

Thermoplastic resins have a relatively good wet strength. While the wet strength of paper is not very good. When the multi-ply laminate (paper and resin) is used to contain moist materials, e.g. garbage, moist grass clippings, etc., the resin forms the inner surface of the bag. When the multi-ply laminate (paper and resin) is used to contain dry materials, e.g. dry powders, seeds, granular fertilizers, etc., the resin forms the outer surface of the bag.

The preferred thermoplastic resins used in the practice of the present invention are as follows:

polyvinyl alcohol, hydroxyethylcellulose polymer, polyethylene glycol polymer, polycaprolactone, polylactic acid, hydroxybutyrate polymer, hydroxyvalerate polymer, and a copolymer of hydroxybutyrate and hydroxyvalerate.

The above-mentioned resins have the common characteristic, that they are composed solely of carbon, hydrogen and oxygen. Also, they contain the hydroxide ion or radical in the monomer, such that they can be hydrolyzed. These resin materials are soluble in water, while at the same time offering resistance to passage of water through the resin layer. When combined with a paper backing layer, these resins can provide a relatively high strength bag material resistant to water penetration, while at the same time being biodegradable in the composting environment. The above-noted resins will sometimes be referred to, individually, as a biodegradable polymer film. Usually the biodegradable film will consist of a single water-soluble polymer. However, it is to be noted that the polymer film materials can be selectively used together in various combinations to form a unitary film having the desired properties. For economic reasons, the usual practice would be to use only one of the water-soluble polymers in the biodegradable film.

In a first form of the present invention, a multi-layer bag material is comprised of a paper layer and a biodegradable polymer film laminated to the paper layer with heat, whereby the surface of the polymer in contact with the paper is fused (melted) to form a bond between the polymer film and paper.

In a second form of the invention, the biodegradable polymer film is formed on a paper backing strip by spraying the polymer onto the paper surface, such that the polymer particles are bonded to the paper surface.

In a third form of the invention, the paper layer is pretreated by applying a thin coating of starch onto one surface of the paper. The coating process can be accomplished by spraying, brushing or rolling the starch (in thin slurry form) onto the paper surface. The biodegradable polymer film is laminated onto the starch-coated surface of the paper layer, preferably using heat and pressure to promote a good adhesive bond between the paper and the polymer. The starch serves as a water-soluble adhesive between the paper and the polymer.

In a fourth form of the invention, a layer of cellophane is combined with the biodegradable polymer and paper to form a three layer laminate, i.e. a paper layer, a polymer layer, and a cellophane layer. The three layers can be bonded together, using heat and pressure. The paper can be uncoated; alternatively, the paper can be pre-coated with starch.

When the bag material is comprised of three layers (i.e. paper, a biodegradable polymer, and cellophane) the paper can be the core layer. Thus, the biodegradable polymer can be bonded to one face of the paper, and the cellophane can be bonded to the other face of the paper, so as to provide a water-resistant coating on both faces of the paper.

It should be noted that various processes and procedures can be used to laminate the selected waterproofing polymers to the paper layer. For illustration purposes, there is included herein a brief description of two methods or procedures that can be used.

FIG. 1, is a schematic representation, showing a side elevational view, of an apparatus that can be used to laminate a biodegradable thermoplastic strip onto a strip of kraft paper, using heat as the laminating force.

Referring now to FIG. 1, there is shown schematically an apparatus for heat-laminating two sheets of material together to form a two-ply sheet or strip. In FIG. 1, the sheets move in a left-to-right direction through the apparatus.

The illustrated apparatus comprises an endless upper steel band 10 trained around a series of rollers 12 to engage the upper surface of a sheet of kraft paper 14. One of the rollers 12 may be powered, such that band 10 pulls the paper sheet 14 through the apparatus.

A heating means 16, e.g., an induction heater, is provided for applying heat to the steel band 10, whereby the band 10 heats the paper strip 14 as the paper strip 14 moves in a left-to-right direction.

The FIG. 1 apparatus further comprises an endless lower steel band 18 trained around a series of rollers 20 to engage the undersurface of a sheet of biodegradable thermoplastic material 22. This thermoplastic material is formed from any one, or combinations of, the preferred thermoplastic resins. The preferred thermoplastic resins used in the practice of the present invention are as follows: polyvinyl alcohol, hydroxyethylcellulose polymer, polyethylene glycol polymer, polycaprolactone, polylactic acid, hydroxybutyrate polymer, hydroxyvalerate polymer, and a copolymer of hydroxybutyrate and hydroxyvalerate.

One of rollers 20 may be powered, at the same surface speed as the powered roller 12, such that endless steel bands 10 and 18 cooperatively pull the engaged sheets (strips) 14 and 22 through the apparatus.

The vertical spacing of the facing surfaces on steel bands 10 and 18 is slightly less than the combined thickness of strips 14 and 22, such that the thermoplastic strip 22 is slightly compressed as it moves through the apparatus. Steel band 18 is unheated.

The heated steel band 10 directs heat, generated by heating means 16, through the paper strip 14 onto the upper surface of thermoplastic strip 22, such that only the surface of thermoplastic strip 22 is melted. The thermoplastic strip is thereby laminated to the kraft paper strip 14 without being thermally degraded.

FIG. 1 is representative of one method of laminating a thermoplastic biodegradable material onto a supporting kraft paper sheet. As noted, it is also believed that the laminating function can be accomplished by spraying the liquid thermoplastic material onto a moving sheet of kraft paper, to form a thermoplastic film on the paper surface. Further, the laminating operation is preferably performed with the use of starch and/or other biodegradable adhesives.

Figure 2:
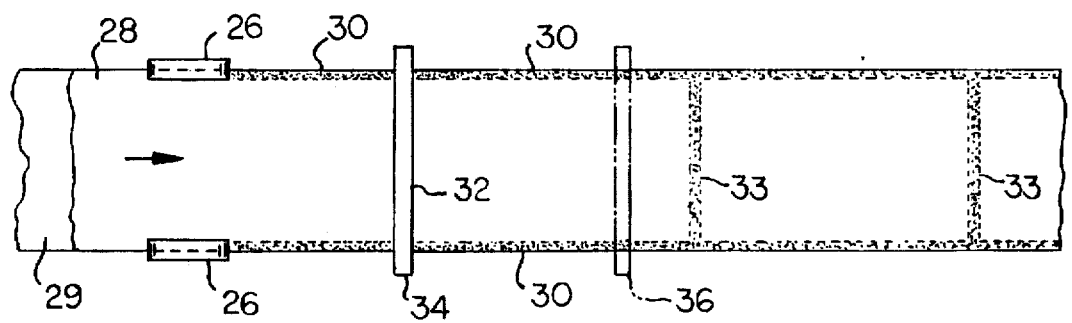
FIG. 2 is a schematic representation of an apparatus that can be used to join selected areas of two multi-ply strips together into a bag configuration.

FIG. 2, is a schematic representation of an apparatus that can be used to join selected areas of two multi-ply strips together into a bag configuration.

FIG. 2 schematically illustrates, in top plan view, an apparatus that can be used to join selected areas of two sheets together, to form a bag construction having utilitarian value. Each of the two sheets fed into the FIG. 2 apparatus will be a two-ply sheet formed out of kraft paper and the above-described biodegradable thermoplastic material. In FIG. 2, the two multi-ply sheets 28 and 29 move through the apparatus in a left-to-right direction.

The FIG. 2 apparatus comprises two sets of heated rollers 26 adapted to engage the upper and lower surfaces of two multi-ply sheets 28 and 29 as the sheets advance in a left-to-right direction. Each edge area of the sheet assembly is squeezed between an upper heated roller 26 and a lower heated roller 26, such that the thermoplastic materials are fused together to form a heat-sealed connection between the two sheets, i.e. 28 and 29.

Sheets 28 and 29 are arranged so that the paper laminations are in contact with heated rollers 26, such that heat travels through the paper to reach the plastic materials. In FIG. 2, the heat-sealed edge areas of the multi-ply sheets are designated by numerals 30.

A transverse heat sealing platen 32 is provided for forming transverse heat-sealed connections 33 between sheets 28 and 29 at spaced points along the sheet travel direction. Heated platen assembly 32 can include an upper heated platen and a lower heated platen arranged to exert a squeezing action on sheets 28 and 29 when the platen assembly is in the position designated by numeral 34.

As the sheet assembly moves in the left-to-right direction, the platen assembly 32 is moved with the sheet assembly to the position designated by numeral 36; during this operation the platens form the transverse heat-sealed connections 33. When position 36 is reached, the heated platens separate and rapidly return to position 34, to begin a new operational cycle.

Individual bags can be formed by severing the sheet assembly along lines proximate to heat-sealed connections 33. A flying shears can be used to perform the cutting operation on the travelling sheet assembly.

The invention relates, in part, to mechanisms and procedures for forming two-ply laminated sheets comprised of kraft paper and a film of biodegradable thermoplastic material, with the presence of adhesives that do not interfere with microbiological attack on the bag materials in the composting environment.

The invention further concerns mechanisms and procedures for heat-sealing selected areas of the laminated sheets, to form useful bag structures with the use of biodegradable adhesives.

The drawings show particular apparatus that can be used to practice the invention. However, it will be appreciated that the invention can be practiced with different apparatus. In practice of the present invention the multi-ply sheets will be arranged so that the thermoplastic films (plies) form the surfaces of the bags that are to come in contact with moisture. In some cases that surface will be the bag inner surface, e.g., when the bag is to contain moist materials. In other cases, the moisture-resistant surface will be the bag outer surface, e.g., when the bag is to contain dry powdered or granulated materials, etc.

The present invention describes biodegradable bags and processes for making such biodegradable bags. The drawings herein necessarily depict specific structural features and embodiments of the processes for making such biodegradable bags.

However, it will be appreciated by those skilled in the arts pertaining thereto, that the present invention can be practiced in various alternate forms and configurations. Further, the previously detailed descriptions of the preferred embodiments of the present invention, are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A multi-ply laminate bag material consisting of a paper layer, a biodegradable polymer resin layer, and an intervening biodegradable adhesive layer between the paper layer and polymer resin layer;

said biodegradable adhesive layer being formed of starch; and said polymer resin layer being formed of a material selected from the group consisting of hydroxybutyrate polymer, hydroxyvalerate polymer, and a copolymer of hydroxybutyrate and hydroxyvalerate.

2. The bag material, as described in claim 1, wherein said resin layer is hydroxybutyrate polymer.

3. The bag material, as described in claim 1, wherein said resin layer is hydroxyvalerate polymer.

4. The bag material, as described in claim 1, wherein said resin layer is a copolymer of hydroxybutyrate and hydroxyvalerate.

* * * * *